United States Patent
Grass

(10) Patent No.: US 11,728,524 B2
(45) Date of Patent: Aug. 15, 2023

(54) BATTERY ARRANGEMENT FOR AN ELECTRICALLY DRIVABLE MOTOR VEHICLE

(71) Applicant: Dr. Ing. h.c. F. Porsche Aktiengesellschaft, Stuttgart (DE)

(72) Inventor: Dominik Grass, Bietigheim-Bissingen (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 189 days.

(21) Appl. No.: 17/155,603

(22) Filed: Jan. 22, 2021

(65) Prior Publication Data
US 2021/0280921 A1 Sep. 9, 2021

(30) Foreign Application Priority Data
Mar. 3, 2020 (DE) ...................... 10 2020 105 614.1

(51) Int. Cl.
*H01M 50/20* (2021.01)
*H01M 10/42* (2006.01)
(Continued)

(52) U.S. Cl.
CPC ........... *H01M 10/425* (2013.01); *B60L 50/64* (2019.02); *B60L 58/26* (2019.02); *H01M 50/20* (2021.01);
(Continued)

(58) Field of Classification Search
CPC .............. H01M 10/425; H01M 50/20; H01M 2010/4271; H01M 2220/20;
(Continued)

(56) References Cited

U.S. PATENT DOCUMENTS 10,759,284 B2 9/2020 Jaensch et al.
2016/0004284 A1* 1/2016 Cohen .................... G06F 1/203
156/185
(Continued)

FOREIGN PATENT DOCUMENTS

CN 110 534 830 12/2019
DE 10 2015 117 974 4/2016
(Continued)

OTHER PUBLICATIONS

Machine English translation of DE 102015219558 (Year: 2017).*
German Examination Report dated Nov. 18, 2020.

*Primary Examiner* — Michael L Dignan
(74) *Attorney, Agent, or Firm* — Gerald E. Hespos; Michael J. Porco

(57) ABSTRACT

A battery arrangement (10) for an electrically drivable motor vehicle has a battery housing (12) for receiving battery cells for electrically driving the motor vehicle. A control electronics system (14) is provided outside the battery housing (12) for controlling the battery cells. A module housing (16) is connected to the battery housing (12) for covering the control electronics system (14) and a module heat-conducting element (28) is provided between the control electronics system (14) and the module housing (16) so that heat generated in the control electronics system (14) is dissipated to the module housing (16) by heat conduction. The module housing (16) and the module heat element (28) passively cool the control electronics system (14), which is provided outside the battery housing (12), thereby providing simple and cost-effective dissipation of heat produced in the battery arrangement (10).

10 Claims, 1 Drawing Sheet

(51) Int. Cl.
   *B60L 58/26*      (2019.01)
   *B60L 50/64*      (2019.01)
(52) U.S. Cl.
   CPC ............... *H01M 2010/4271* (2013.01); *H01M 2220/20* (2013.01)
(58) Field of Classification Search
   CPC ............ H01M 10/613; H01M 10/625; H01M 10/653; H01M 10/655; H01M 10/667; B60L 50/64; B60L 58/26; B60K 1/04; H05K 7/20089
   See application file for complete search history.

(56) References Cited

U.S. PATENT DOCUMENTS

| | | | | |
|---|---|---|---|---|
| 2016/0118700 A1* | 4/2016 | Perumalla | ........... | H01M 10/425 |
| | | | | 429/7 |
| 2018/0166756 A1* | 6/2018 | Inoue | ................... | H01M 10/482 |
| 2019/0214618 A1* | 7/2019 | Nakamura | ........ | H01M 10/6554 |
| 2020/0161605 A1* | 5/2020 | Ruan | ................... | H01M 10/613 |
| 2021/0083247 A1* | 3/2021 | Schmitt | ............... | H01M 10/613 |
| 2021/0143487 A1* | 5/2021 | Gross | .................. | H01M 10/482 |
| 2022/0294042 A1* | 9/2022 | Hantschel | ........... | H01M 10/425 |

FOREIGN PATENT DOCUMENTS

| | | | | | |
|---|---|---|---|---|---|
| DE | 10 2015 219 558 | | 4/2017 | | |
| DE | 102015219558 | * | 4/2017 | .......... | H01M 10/667 |
| DE | 10 2017 122 661 | | 3/2019 | | |
| EP | 3819980 | * | 5/2021 | .......... | H01M 50/224 |

* cited by examiner

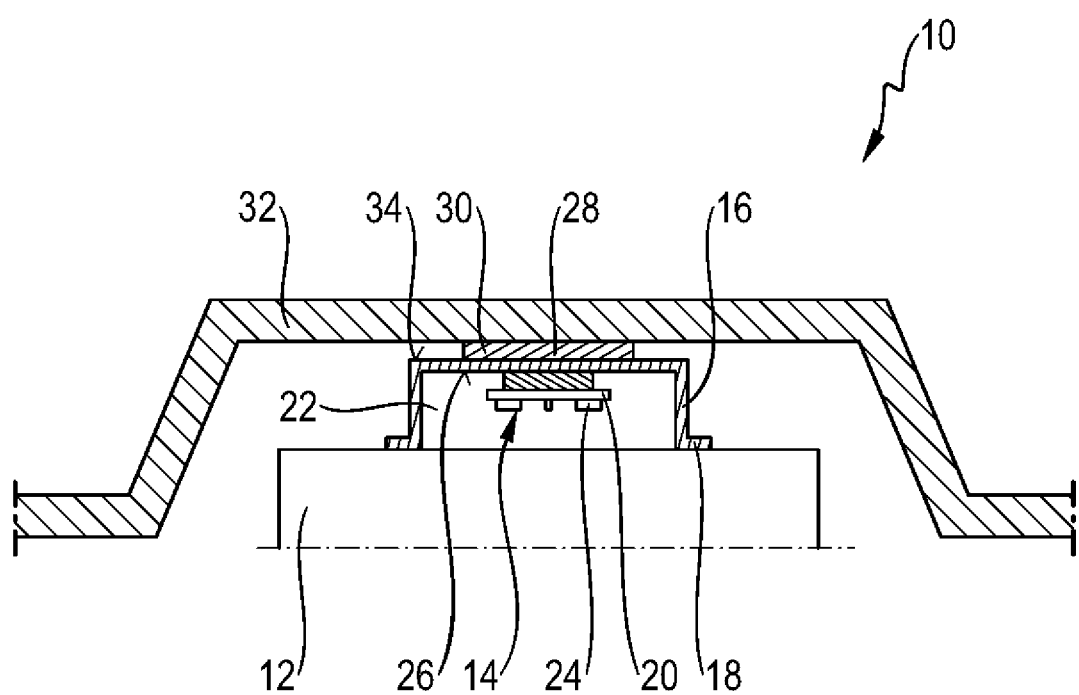

BATTERY ARRANGEMENT FOR AN ELECTRICALLY DRIVABLE MOTOR VEHICLE

CROSS REFERENCE TO RELATED APPLICATION

This application claims priority under 35 USC 119 to German Patent Appl. No. 10 2020 105 614.1 filed on Mar. 3, 2020, the entire disclosure of which is incorporated herein by reference.

BACKGROUND

Field of the Invention

The invention relates to a battery arrangement that enables an electrically drivable motor vehicle to be driven electrically.

Related Art

DE 10 2015 219 558 A1 discloses a control electronics system that is accommodated in the interior of a battery housing of a traction battery for a motor vehicle to control the traction battery. A heat-conducting apparatus thermally couples the control electronics system to a region of the battery housing that is cooled by a battery cooling arrangement. Thus, the battery cooling arrangement can actively cool both the traction battery and the control electronics system.

There is a constant need for a simple cost-effective means to dissipate heat that is produced in a battery arrangement An object of the invention is to provide a simple and cost-effective dissipation of heat produced in a battery arrangement.

SUMMARY

The invention provides a battery arrangement for an electrically drivable motor vehicle. The battery arrangement comprises a battery housing for receiving battery cells for electrically driving the motor vehicle. A control electronics system is provided outside the battery housing and controls the battery cells. A module housing is connected to the battery housing and covers the control electronics system, and a module heat-conducting element is provided between the control electronics system and the module housing. The module heat-conducting element dissipates heat from the control electronics system to the module housing by heat conduction.

The control electronics system is not provided in the interior of the battery housing. Thus, the battery housing can be constructed in a simple cost-effective manner and can be designed only for receiving and possibly cooling the battery cells. The three-dimensional configuration of the battery housing can be simplified in this way. Thus, it is possible to form the battery housing using cost-effective production methods, for example by stamping out of a metal sheet and shaping without cutting. The control electronics system is provided outside the battery housing and can communicate with the battery cells in the battery housing through the battery housing, for example via cables to monitor the stored electrical energy and/or to connect various battery cells for charging and/or outputting electrical energy. The module housing is different from the battery housing and covers the control electronics system to protect the control electronics system against external influences. The module housing can be configured to be open toward the battery housing so that an interior space for the control electronics system that is covered by the module housing is delimited by the battery housing on one side.

Heat generated by the control electronics system can be received to a maximum possible degree by the module heat-conducting element and can be dissipated to the module housing by heat conduction with the lowest possible thermal resistance to cool the control electronics system. The module housing has an outer side that faces away from the delimited interior space for the control electronics system, and the discharged heat can be dissipated readily via this outer side. For example, the module housing can project from the battery housing in a comparable manner to a cooling fin and can be cooled by natural convection. Thus, adequate cooling of the control electronics system can be achieved without costly active cooling. The module heat element enables the control electronics system that is provided outside the battery housing to be cooled passively via the module housing to provide simple and cost-effective dissipation of heat from the battery arrangement.

The module housing can be produced from metal, such as steel or aluminum, with high thermal conductivity. Thus, the heat of the control electronics system is received from the module heat-conducting element and is distributed easily via all of the material of the module housing. As a result, substantially the entire surface area of the outer side of the module housing can be used for dissipating heat. The outer side of the module housing can have a substantially planar face that follows the shape of the covered interior space of the module housing. As an alternative, cooling fins can be provided on the outer side of the module housing to improve the convective cooling. The battery cells in the battery housing are cooled by a cooling apparatus that is provided below the battery cells in the direction of gravity. The control electronics system and the module housing can be mounted onto the battery housing above the battery cells in the direction of gravity.

The module housing may be pressed against a structural metal component of the motor vehicle. For example, the module housing and/or the battery housing may be fastened, in particular screwed, to the structural metal component, so that the module housing can be pressed against the structural metal component. As a result, the module housing can dissipate at least a portion of the heat that is received by the module heat-conducting element to the structural metal component by heat conduction. The heat capacity and the surface of the structural metal component also can be used for passive heat dissipation and for cooling the control electronics system. The structural metal component may be configured to discharge forces at least to a certain extent, so that the contact pressure of the module housing does not deform the structural metal component.

The structural metal component may be a vehicle body element of a vehicle outer shell and/or a load-bearing carrying frame element that may be connected to the vehicle body element. The structural metal component can be part of the motor vehicle body and/or part of a carrying frame for fastening the motor vehicle body and a drive train. As a result, the structural metal component has a high mass and therefore a high heat capacity. Thus, the structural metal component can store a correspondingly high quantity of heat and can output that heat convectively via the surface. In addition, the structural metal component can have a comparatively large surface, thereby improving the convective heat dissipation. If the structural metal component is part of the outer shell of the motor vehicle, the air stream flowing along the outer shell can provide particularly good passive cooling of the control electronics system.

The structural metal component may have a greater heat capacity and/or a larger surface than the module housing. As a result, the convective dissipation of the heat that is generated in the control electronics system can be performed via the structural metal component. Additionally, motor vehicle components in the interior of the motor vehicle are not heated by heat that received by the module housing.

An outer heat-conducting element is provided on an outer side of the module housing and dissipates heat that is received in the module housing to a structural metal component of the motor vehicle. The outer side faces away from the control electronics system and from the battery housing. The outer heat-conducting element can improve the thermal connection of the module housing to the structural metal component and can increase the dissipation of heat from the module housing to the structural metal component. The module heat-conducting element and the outer heat-conducting element may be produced from the same material and/or may have the same dimensions, so that the module heat-conducting element and the outer heat-conducting element may be configured as identical parts.

The control electronics system may have heat-generating electronics components mounted on a printed circuit board. A rear side of the printed circuit board faces away from the electronics components and is pressed directly against the module heat-conducting element for passively cooling the electronics components bears. The electronics components can project from the printed circuit board away from the module heat-conducting element and into the interior space that is delimited by the module housing. The printed circuit board has a comparatively planar rear side so that flat contact of the printed circuit board with the module heat-conducting element can be induced to achieve a high heat flow. The electronics components that project from the printed circuit board can face the battery housing to facilitate communication of the control electronics system through the battery housing.

The module heat-conducting element may bear flat against the module housing in a manner spaced to the maximum extent from the battery housing. Thus, thermal dissipation of heat of the control electronics system and the electrical communication of the control electronics system with the battery cells can be performed on different sides of the control electronics system so that they do not adversely affect each other.

The module housing is coupled thermally to the battery housing by heat conduction. Thus, a heat flow that is dissipated via the outer side of the module housing is greater than a heat flow that is dissipated from the module housing to the battery housing. Accordingly, a heat flow from the battery housing to the module housing is provided in the case of battery cells that are heated to a designated operating temperature. The module housing can be connected to the battery housing via a flat contact by a fastening flange to achieve thermal coupling. However, the heat that is generated in the control device is dissipated predominantly via the outer side of the module housing, in particular via the thermally coupled structural metal component, and not via the battery housing. As a result, a heat flow between the module housing and the battery housing is not precluded. In general, a heat flow from the module housing to the battery housing can be negligible in comparison to the heat flow that is dissipated via the outer side of the module housing, and therefore thermal insulation between the module housing and the battery housing is not required. Instead, heat generated in the battery cells is not dissipated completely by a cooling device and, due to natural convection, collects in an upper region of the battery housing and heats the battery housing in the upper region, to be received by the battery housing and dissipated via the module housing. The passive cooling for cooling the control electronics system also can contribute to cooling of the battery cells. Therefore, the cooling device that is provided for cooling the battery cells can be constructed in a more simple and more cost-effective manner. In particular, it is possible to provide cooling by the cooling device only in a lower region of the motor vehicle battery and to dissipate heat that remains in the upper region of the battery housing via the module housing that is provided for the control device.

The module heat-conducting element and/or the outer heat-conducting element may be produced from a deformable material for compensating for surface unevenness. The module heat-conducting element and/or the outer heat-conducting element may be a heat-conducting pad and/or gap filler, and therefore a rather heat-insulating air gap can be filled by a heat-conducting material. Surface unevenness can be compensated for when the module heat-conducting element and/or the outer heat-conducting element is pressed between the parts that are to be connected thermally. The deformable material of the module heat-conducting element or of the outer heat-conducting element has, for example, a thermal conductivity A of $1.0\ W/m^2K \leq \lambda \leq 8.0\ W/m^2K$ and/or deformability, with reference to the unloaded material thickness, of up to ±10%.

The invention is explained by way of example below to a preferred embodiment. The features presented below can each constitute an aspect of the invention either individually or in combination.

BRIEF DESCRIPTION OF THE DRAWINGS

FIG. 1 is a schematic sectional view of a battery arrangement.

DETAILED DESCRIPTION

The battery arrangement 10 illustrated in FIG. 1 can be used for an electrically drivable motor vehicle. The battery arrangement 10 has a battery housing 12 of a traction battery for purely electrically driving the motor vehicle. The battery housing battery cells for storing and for outputting electrical energy are received in the battery housing 12. These battery cells are monitored and controlled with the aid of a control electronics system 14. The control electronics system 14 is provided outside the battery housing 12 and is protected against external influences with the aid of a module housing 16. For example, the module housing 16 has a flange 18 that is mounted in a flat manner on the upper end of the battery housing 12 and screwed or otherwise fastened to the battery housing 12.

The control electronics system 14 has a printed circuit board 20, and electronics components 24 project from the printed circuit board 20 into an interior space 22 that is delimited by the module housing 16 and the battery housing 12. The printed circuit board 20 of the control electronics system 14 is fastened to an inner side 26 of the module housing 16 that faces the battery housing 12 and is spaced apart to the maximum extent from the battery housing 12. A module heat-conducting element 28 is configured as a thermally conductive gap filler in particular and is provided between the inner side 26 of the module housing 16 and a side of the printed circuit board 20 that faces away from the electronics components 24. The module heat-conducting element 28 is pressed between the printed circuit board 20 and the module housing 16. The module housing 16, in turn, is pressed against a structural metal component 32 of the motor vehicle by means of an interposed outer heat-conducting element 30 that is configured as a thermally conductive gap filler. The outer heat-conducting element 30 can be pressed between an outer side 34 of the module housing 16 and the structural metal component 32. The structural metal component 32 can be, for example, part of the motor vehicle body and/or part of a load-bearing carrying frame. The heat that is generated in the control device 14 can be discharged by heat conduction to the module housing 16 and/or to the structural metal component 32, where the heat can be dissipated passively by natural convection, without active cooling being provided for this purpose.

What is claimed is:

1. A battery arrangement for an electrically drivable motor vehicle that has a structural metal component, the battery arrangement comprising:

a battery housing for receiving battery cells for electrically driving the motor vehicle;

a module housing having a flange mounted externally on the battery housing, portions of the module housing extending from the flange being configured to define an interior space between the module housing and the battery housing;

a module heat-conducting element having a first surface secured to a surface of the module housing facing toward the battery housing at a position in the interior space, the module heat-conducting element further having a second surface opposite the first surface and spaced from the battery housing;

a control electronics system configured to control the battery cells, the control electronics system being mounted to the second surface of the module heat-conducting element so that the control electronics system is in the interior space defined by the module housing and at a position spaced from the battery housing, whereby heat generated in the control electronics system is dissipated to the module housing by heat conduction; and an outer heat-conducting element secured to a surface of the module housing opposite the surface of the module housing to which the module heat-conducting element is secured, the outer heat-conducting element being pressed against the structural metal component of the motor vehicle;

wherein the module heat-conducting element and the outer heat-conducting element is produced from a deformable material is configured to compensate for surface unevenness.

2. The battery arrangement of claim 1, wherein the structural metal component is a vehicle body element of a vehicle outer shell and/or a load-bearing carrying frame element that is connected to the vehicle body element.

3. The battery arrangement of claim 2, wherein the structural metal component has a greater heat capacity and/or a larger surface than the module housing.

4. The battery arrangement of claim 1, wherein the outer heat-conducting element faces away from both the control electronics system and the battery housing for dissipating heat that is received in the module housing to the structural metal component of the motor vehicle.

5. The battery arrangement of claim 4, wherein the control electronics system has a printed circuit board with opposite front and rear sides, heat-generating electronics components being mounted on the front side of the printed circuit board at positions spaced from and facing the battery housing, the second surface of the module heat-conducting element being pressed directly against the rear side of the printed circuit board for passively cooling the electronics components.

6. The battery arrangement of claim 5, wherein the module housing has opposite inner and outer surfaces, the module heat-conducting element bears flat against the inner surface module housing and is spaced apart from the battery housing.

7. The battery arrangement of claim 1, wherein the flange of the module housing is thermally coupled to the battery housing by heat conduction so that a heat flow that is dissipated via the outer surface of the module housing is greater than a heat flow that is dissipated from the flange of the module housing to the battery housing.

8. The battery arrangement of claim 1, wherein the module housing and the module heat-conducting element are disposed above the battery housing in a direction of gravity.

9. The battery arrangement of claim 1, wherein the flange of the module housing is mounted in a flat manner on the battery housing.

10. The battery arrangement of claim 9, wherein the flange of the module housing is screwed to the battery housing.

* * * * *